United States Patent
Frieberg et al.

(10) Patent No.: US 11,848,440 B2
(45) Date of Patent: Dec. 19, 2023

(54) PRELITHIATED NEGATIVE ELECTRODES INCLUDING COMPOSITE LI—SI ALLOY PARTICLES AND METHODS OF MANUFACTURING THE SAME

(71) Applicant: GM GLOBAL TECHNOLOGY OPERATIONS LLC, Detroit, MI (US)

(72) Inventors: Bradley R. Frieberg, Farmington Hills, MI (US); Zhongyi Liu, Troy, MI (US); Xiaosong Huang, Novi, MI (US); James R. Salvador, East Lansing, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 289 days.

(21) Appl. No.: 17/220,050

(22) Filed: Apr. 1, 2021

(65) Prior Publication Data

US 2022/0320493 A1    Oct. 6, 2022

(51) Int. Cl.
| | |
|---|---|
| H01M 4/36 | (2006.01) |
| H01M 4/40 | (2006.01) |
| H01M 10/052 | (2010.01) |
| H01M 10/0562 | (2010.01) |
| H01M 4/62 | (2006.01) |
| H01M 4/38 | (2006.01) |
| H01M 4/02 | (2006.01) |

(52) U.S. Cl.
CPC ........... *H01M 4/366* (2013.01); *H01M 4/386* (2013.01); *H01M 4/405* (2013.01); *H01M 4/622* (2013.01); *H01M 4/625* (2013.01); *H01M 10/052* (2013.01); *H01M 10/0562* (2013.01); *H01M 2004/021* (2013.01); *H01M 2004/027* (2013.01); *H01M 2300/0068* (2013.01)

(58) Field of Classification Search
None
See application file for complete search history.

(56) References Cited

U.S. PATENT DOCUMENTS

| | | |
|---|---|---|
| 8,440,350 B1 | 5/2013 | Verbrugge et al. |
| 8,859,144 B2 | 10/2014 | Xiao |
| 8,999,584 B2 | 4/2015 | Jiang et al. |
| 9,005,811 B2 | 4/2015 | Xiao et al. |
| 9,093,705 B2 | 7/2015 | Xiao et al. |
| 9,142,830 B2 | 9/2015 | Xiao et al. |
| 9,302,914 B2 | 4/2016 | Liu et al. |
| 9,362,551 B2 | 6/2016 | Sachdev et al. |
| 9,379,374 B2 | 6/2016 | Liu et al. |
| 9,531,004 B2 | 12/2016 | Xiao et al. |
| 9,564,639 B2 | 2/2017 | Huang |
| 9,570,752 B2 | 2/2017 | Huang et al. |
| 9,577,251 B2 | 2/2017 | Xiao et al. |
| 9,780,361 B2 | 10/2017 | Xiao et al. |
| 10,062,898 B2 | 8/2018 | Xiao |
| 10,164,245 B2 | 12/2018 | Huang |
| 10,854,882 B2 | 12/2020 | Halalay et al. |
| 10,868,307 B2 | 12/2020 | Huang |
| 10,950,846 B2 | 3/2021 | Xiao et al. |
| 11,228,037 B2 | 1/2022 | Huang et al. |
| 11,349,119 B2 | 5/2022 | Halalay et al. |
| 11,424,442 B2 | 8/2022 | Frieberg et al. |
| 2013/0164608 A1* | 6/2013 | Ihara ............... H01M 10/0445 429/188 |
| 2018/0205114 A1 | 7/2018 | Pauric et al. |
| 2019/0115615 A1* | 4/2019 | Kwon ............ H01M 10/052 |
| 2020/0052330 A1* | 2/2020 | Choi ............. H01M 10/0565 |
| 2021/0202987 A1* | 7/2021 | Yoshida ......... H01M 10/0562 |
| 2022/0238885 A1 | 7/2022 | Koestner et al. |
| 2022/0320489 A1* | 10/2022 | Frieberg ............ H01M 4/366 |

FOREIGN PATENT DOCUMENTS

| | | |
|---|---|---|
| CN | 115207334 A | 10/2022 |
| DE | 102022105096 A1 | 10/2022 |

OTHER PUBLICATIONS

Nakamura, H., Kawaguchi, T., Masuyama, T., Sakusa, A., Saito, T., Kuratani, K., Ohsaki, S., Watano, S.—Dry coating of active material particles with sulfide solid electrolytes for an all-solid-state lithium battery,https://www.sciencedirect.com/science/article/pii/S0378775319315721?via%3Dihub (Year: 2019).*

Michael P. Balogh et al.; "Communication—Solid-State Synthesis of Lithium Silicide;" ECS Journal of Solid State Science and Technology; Aug. 10, 2020; 5 pages.

"Methods of Forming Prelithiated Silicon Alloy Electroactive Materials", U.S. Appl. No. 16/706,351, filed Dec. 6, 2019.

* cited by examiner

*Primary Examiner* — Anca Eoff
(74) *Attorney, Agent, or Firm* — Harness, Dickey & Pierce, P.L.C.

(57) ABSTRACT

A method of making a negative electrode for an electrochemical cell of a secondary lithium battery. The negative electrode includes composite Li—Si alloy particles dispersed in a polymer binder. The composite Li—Si alloy particles are formed by contacting Li—Si alloy particles with a precursor solution that includes a phosphorus sulfide compound dissolved in an organic solvent to form a lithium thiophosphate solid electrolyte layer over an entire outer surface of each of the Li—Si alloy particles.

18 Claims, 1 Drawing Sheet

PRELITHIATED NEGATIVE ELECTRODES INCLUDING COMPOSITE LI—SI ALLOY PARTICLES AND METHODS OF MANUFACTURING THE SAME

INTRODUCTION

The present invention relates to negative electrodes of secondary lithium batteries and, more particularly, to methods of manufacturing prelithiated electroactive materials for negative electrodes of secondary lithium batteries and to methods of manufacturing negative electrodes for secondary lithium batteries including the prelithiated electroactive materials.

Secondary lithium batteries generally include one or more electrochemical cells having a negative electrode, a positive electrode, and an ionically conductive electrolyte that provides a medium for the conduction of lithium ions through the electrochemical cell between the negative and positive electrodes. The negative and positive electrodes are electrically isolated from one another within the electrochemical cell and may be spaced apart from one another by a porous polymeric separator. At the same time, the negative and positive electrodes are electrically connected to one another outside the electrochemical cell via an external circuit. In practice, each of the negative and positive electrodes is typically carried on a metallic current collector and is connected to the external circuit via its respective current collector. The negative and positive electrode materials are formulated so that, when the battery is at least partially charged, an electrochemical potential difference is established between the negative and positive electrodes within the electrochemical cell.

During battery discharge, the electrochemical potential established between the negative and positive electrodes drives spontaneous reduction-oxidation (redox) reactions within the electrochemical cell and the release of lithium ions and electrons at the negative electrode. The released lithium ions travel from the negative electrode (or anode) to the positive electrode (or cathode) through the ionically conductive electrolyte, and the electrons travel from the negative electrode to the positive electrode via the external circuit, which generates an electric current. After the negative electrode has been partially or fully depleted of lithium, the electrochemical cell may be recharged by connecting the negative and positive electrodes to an external power source, which drives nonspontaneous redox reactions within the electrochemical cell and the release of the lithium ions and the electrons from the positive electrode.

The energy density of a battery is a measurement of the amount of energy the battery can store per unit of mass and is determined collectively by the electrochemical potential difference between the negative and positive electrode materials (increasing the potential difference increases the amount of energy the battery can produce) and the specific capacity of the negative and positive electrode materials, i.e., the amount of charge that the electrode materials can store per unit of mass. In a secondary lithium battery, the specific capacity of the negative and positive electrode materials corresponds to the amount of active lithium in the negative and positive electrode materials that is available to participate in the necessary redox reactions occurring within the electrochemical cells during charging and discharging of the battery. In other words, the amount of "active" lithium in the negative and positive electrode materials is the amount of lithium that can be stored in and subsequently released from the negative and positive electrode materials during repeated charging and discharging cycles of the battery.

The amount of active lithium present in a secondary lithium battery after initial assembly, however, may be reduced during initial charging of the battery and during repeated cycling of the battery. For example, during initial charging of a secondary lithium battery, an electrically insulating and ionically conductive layer referred to as a solid electrolyte interphase (SEI) may inherently form in-situ on a surface of the negative electrode at an interface between the negative electrode and the electrolyte. This native SEI is believed to inherently form due to the low reduction potential of the electrochemically active material of the negative electrode, which promotes reduction of the electrolyte at the surface of the negative electrode material. However, the chemical reactions between the negative electrode material and the electrolyte that occur during formation of the SEI are believed to be parasitic and may consume active lithium, which may lead to irreversible capacity loss and may decrease the cycle life of the battery.

Silicon (Si) is a promising electrochemically active negative electrode material for secondary lithium batteries due to its low electrochemical potential (about 0.06 V vs. Li/Li$^+$) and its high theoretical specific capacity (up to about 4200 mAh/g). The practical application of silicon as a negative electrode material, however, is currently limited by the amount of active lithium consumed during initial charging of the battery due to SEI formation, as well as by the large change in volume silicon-based negative electrodes inherently experience during charging and discharging of the battery, e.g., up to about 300%. For example, the inherent volume changes experienced by silicon-based negative electrodes during repeated battery cycling may undermine the stability of the SEI, potentially leading to cracks or gaps in the SEI. These cracks or gaps may disrupt the electrically insulating barrier function of the SEI and may lead to further lithium-consuming chemical reactions between the electrolyte and the exposed surfaces of the silicon-based negative electrode. As such, when silicon is used as a negative electrode material in a secondary lithium battery, active lithium may be continuously consumed even after initial SEI formation due to repeated exposure of the negative electrode material to the electrolyte and the inherent in-situ formation of new SEI material along exposed surfaces of the negative electrode.

To compensate for the loss of active lithium during battery cycling, a stoichiometric excess of lithium may be incorporated into electrochemical cells of secondary lithium batteries.

SUMMARY

A method of making a negative electrode for an electrochemical cell of a secondary lithium battery is disclosed. In the method, lithium-silicon (Li—Si) alloy particles may be placed in contact with a precursor solution that includes a phosphorus sulfide compound dissolved in an organic solvent to form a lithium thiophosphate solid electrolyte layer over an entire outer surface of each of the Li—Si alloy particles. Contact between the Li—Si alloy particles and the precursor solution may be maintained until each of the Li—Si alloy particles is entirely encapsulated by the lithium thiophosphate solid electrolyte layer. Then, the Li—Si alloy particles may be separated from the organic solvent.

The organic solvent may comprise a polar aprotic organic solvent.

The organic solvent may comprise N-Methyl-2-pyrrolidone.

The phosphorus sulfide compound may comprise, by weight, 15-25% phosphorus and 75-85% sulfur.

The phosphorus sulfide compound may be represented by the formula $P_4S_x$, wherein x is an integer and wherein $2 \leq x \leq 16$.

The phosphorus sulfide compound may comprise $P_4S_{16}$.

The phosphorus sulfide compound may be present in the precursor solution at a concentration in a range of 1 mg/mL to 20 mg/mL.

The lithium thiophosphate solid electrolyte layer may be at least partially amorphous and may exhibit an ionic conductivity in a range of $3 \times 10^{-7}$ S/cm to $1.6 \times 10^{-4}$ S/cm at a temperature of 25° C.

The lithium thiophosphate solid electrolyte layer may comprise, by weight, 3-15% lithium, 10-40% phosphorus, and 50-90% sulfur.

The lithium thiophosphate solid electrolyte layer may comprise $Li_3PS_4$.

Each of the Li—Si alloy particles may have a particle diameter in a range of one micrometer to 40 micrometers, and the lithium thiophosphate solid electrolyte layer surrounding each of the Li—Si alloy particles may have a thickness in a range of one nanometer to 100 nanometers.

A method of making a negative electrode for an electrochemical cell of a secondary lithium battery is disclosed. In the method, a precursor mixture may be prepared that includes electrochemically active particles, electrically conductive carbon particles, and a polymer binder dissolved in an organic solvent. The electrochemically active particles may include composite lithium-silicon (Li—Si) alloy particles. The precursor mixture may be deposited on a surface of a metal substrate to form a precursor layer thereon. At least a portion of the organic solvent may be removed from the precursor layer to form a negative electrode layer on the surface of the substrate. The Li—Si alloy particles may exhibit a core-shell structure including a core made of a lithium-silicon (Li—Si) alloy and a shell surrounding the core made of a lithium thiophosphate solid electrolyte material.

The Li—Si alloy particles may comprise a lithium-silicon (Li—Si) alloy represented by a formula $Li_{4.4x}Si$, where $0 \leq x \leq 0.85$. The lithium thiophosphate solid electrolyte material may comprise, by weight, 3-15% lithium, 10-40% phosphorus, and 50-90% sulfur.

A negative electrode for an electrochemical cell of a secondary lithium battery is disclosed. The negative electrode may comprise a negative electrode layer disposed on a surface of a metal substrate. The negative electrode layer may include a matrix phase and a particulate phase dispersed throughout the matrix phase. The particulate phase may include composite lithium-silicon (Li—Si) alloy particles. Each of the composite Li—Si alloy particles may include a core made of an electrochemically active lithium-silicon (Li—Si) alloy and a shell surrounding the core made of a lithium thiophosphate solid electrolyte material. The shell may be formed directly on an outer surface of the core.

The matrix phase may include a polymer binder. The particulate phase may include the composite Li—Si alloy particles and electrically conductive carbon particles.

The matrix phase may account for, by weight, 2-20% of the negative electrode layer. The particulate phase may account for, by weight, 60-98% of the negative electrode layer. The electrochemically active composite Li—Si alloy particles may account for, by weight, 60-96% of the negative electrode layer.

The lithium thiophosphate solid electrolyte material may be at least partially amorphous and may exhibit an ionic conductivity in a range of $3 \times 10^{-7}$ S/cm to $1.6 \times 10^{-4}$ S/cm at a temperature of 25° C.

The lithium thiophosphate solid electrolyte material may comprise, by weight, 3-15% lithium, 10-40% phosphorus, and 50-90% sulfur.

The lithium thiophosphate solid electrolyte material may comprise $Li_3PS_4$.

The core may have a particle diameter in a range of one micrometer to 40 micrometers, and wherein the shell surrounding the core may have a thickness in a range of one nanometer to 100 nanometers.

The lithium thiophosphate solid electrolyte material may comprise a halogenated lithium thiophosphate that includes at least one halogen element of chlorine, bromine, or iodine. In such case, the at least one halogen element may be present in the halogenated lithium thiophosphate in an amount constituting, by weight, greater than 0% and less than or equal to 35% of the halogenated lithium thiophosphate.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the appended claims.

BRIEF DESCRIPTION OF THE DRAWINGS

Illustrative embodiments will hereinafter be described in conjunction with the appended drawings, wherein like designations denote like elements, and wherein.

Figure 1:
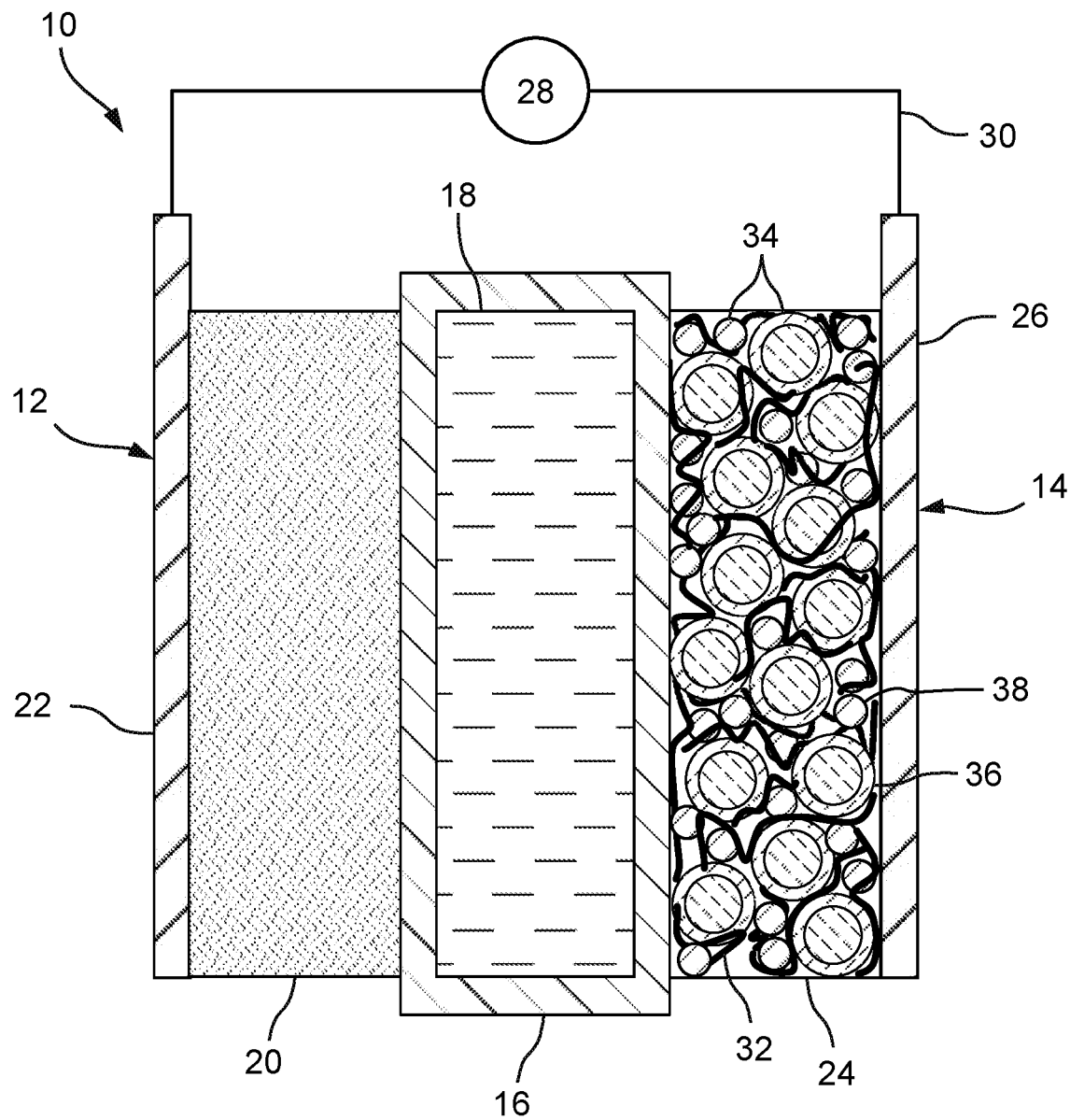
FIG. 1 is a schematic side cross-sectional view of an electrochemical cell for a secondary lithium battery, including a positive electrode, a negative electrode, a porous separator disposed between the positive and negative electrodes, and an ionically conductive electrolyte that provides a medium for the conduction of lithium ions through the electrochemical cell between the positive and negative electrodes, wherein the negative electrode includes electrochemically active composite lithium-silicon (Li—Si) alloy particles.

The present disclosure is susceptible to modifications and alternative forms, with representative embodiments shown by way of example in the drawings and described in detail below. Inventive aspects of this disclosure are not limited to the particular forms disclosed. Rather, the present disclosure is intended to cover modifications, equivalents, combinations, and alternatives falling within the scope of the disclosure as defined by the appended claims.

DETAILED DESCRIPTION

The presently disclosed electrochemically active composite Li—Si alloy particles exhibit a core-shell structure including a core made of a reactive lithium-silicon (Li—Si) alloy and a shell surrounding the core made of a solid, nonreactive ionically conductive and electrically insulating material, referred to herein as a solid electrolyte material. The composite Li—Si alloy particles can be used to form negative electrode layers of secondary lithium batteries and electrochemical cells of secondary lithium batteries that include a stoichiometric surplus of lithium in their negative electrodes prior to initial battery charging.

The solid electrolyte material of the shell passivates the surface of the Li—Si alloy core and prevents the Li—Si alloy from undesirably interacting or reacting with other components of the negative electrode layer during manufacture thereof. For example, during manufacture of the negative electrode layer, a precursor mixture including the composite Li—Si alloy particles and a polymer binder dissolved in an organic solvent may be prepared and deposited in the form of a thin layer on a surface of a metal substrate (e.g., a metal current collector). In such case, when the composite Li—Si alloy particles are combined with the polymer binder and the organic solvent in the precursor mixture, the solid electrolyte material of the shell is believed to create a chemical and physical barrier around the core that prevents the Li—Si alloy of the core from reacting with the polymer binder and/or the organic solvent. Due to the inherent chemical reactivity of lithium, if the solid electrolyte material of the shell were not formed around the Li—Si alloy core, it is believed that the Li—Si alloy core might react with certain types of polymer binders and/or organic solvents in the precursor mixture in a manner that could alter or undermine the electrochemical activity of the Li—Si alloy. As such, if the solid electrolyte material of the shell were not formed around the Li—Si alloy core, it is believed that particles of the Li—Si alloy could not be successfully incorporated into negative electrode layers of secondary lithium batteries without having to restrict the types of polymer binders and/or organic solvents used during the manufacturing process to those that are nonreactive with lithium.

The solid electrolyte material of the shell allows particles of the Li—Si alloy to be included in negative electrode layers of secondary lithium batteries without having to restrict the types of polymer binders and/or organic solvents used during the manufacturing process. In addition, the solid electrolyte material of the shell may provide the composite Li—Si alloy particles with improved oxidative and humidity resistance, which may be beneficial during battery assembly, particularly in large-scale battery assembly facilities. Furthermore, when the composite Li—Si alloy particles are included in the negative electrode layer of an electrochemical cell of a secondary lithium battery, the solid electrolyte material of the shell may help stabilize the physical structure of the negative electrode layer, without inhibiting the ionic conductivity thereof, which may improve the electrochemical performance and cycle life of the battery.

The solid electrolyte material may be formed on the surface of an Li—Si alloy particle by contacting the Li—Si alloy particle with a precursor solution including a phosphorus sulfide compound dissolved in an organic solvent. The reaction between the Li—Si alloy particle and the phosphorus sulfide compound in the precursor solution may be self-limiting, and the concentration of the phosphorus sulfide compound in the precursor solution may be tailored to achieve a desired thickness of the solid electrolyte material on the surface of the Li—Si alloy particle.

FIG. 1 depicts a schematic side cross-sectional view of an electrochemical cell 10 that may be included in a secondary lithium battery. The electrochemical cell 10 includes a positive electrode 12, a negative electrode 14, a porous separator 16 disposed between the positive and negative electrodes 12, 14, and an ionically conductive electrolyte 18 infiltrating the positive and negative electrodes 12, 14 and the porous separator 16. The positive electrode 12 includes a positive electrode material layer 20 disposed on a major surface of a positive electrode current collector 22, and the negative electrode 14 includes a negative electrode material layer 24 disposed on a major surface of a negative electrode current collector 26. In practice, the positive and negative electrode current collectors 22, 26 may be electrically coupled to a power source or load 28 via an external circuit 30.

The porous separator 16 electrically isolates the positive and negative electrodes 12, 14 from each other and may be in the form of a microporous ionically conductive and electrically insulating film or non-woven material, e.g., a manufactured sheet, web, or matt of directionally or randomly oriented fibers. In embodiments, the porous separator 16 may comprise a microporous polymeric material, e.g., a microporous polyolefin-based membrane or film. For example, the porous separator 16 may comprise a single polyolefin or a combination of polyolefins, such as polyethylene (PE), polypropylene (PP), polyamide (PA), poly(tetrafluoroethylene) (PTFE), polyvinylidene fluoride (PVdF), and/or poly(vinyl chloride) (PVC). In one form, the porous separator 16 may comprise a laminate of one or more polymeric materials, such as a laminate of PE and PP.

The electrolyte 18 provides a medium for the conduction of lithium ions through the electrochemical cell 10 between the positive and negative electrodes 12, 14 and may be in the form of a liquid, solid, or gel. For example, the electrolyte 18 may comprise a nonaqueous liquid electrolyte solution including one or more lithium salts dissolved in a nonaqueous aprotic organic solvent or a mixture of nonaqueous aprotic organic solvents. Examples of lithium salts include lithium hexafluorophosphate ($LiPF_6$), lithium perchlorate ($LiClO_4$), lithium tetrachloroaluminate ($LiAlCl_4$), lithium iodide (LiI), lithium bromide (LiBr), lithium thiocyanate (LiSCN), lithium tetrafluoroborate ($LiBF_4$), lithium tetraphenylborate ($LiB(C_6H_5)_4$), lithium bis(oxalato)borate ($LiB(C_2O_4)_2$) (LiBOB), lithium difluorooxalatoborate ($LiBF_2(C_2O_4)$), lithium hexafluoroarsenate ($LiAsF_6$), lithium trifluoromethanesulfonate ($LiCF_3SO_3$), lithium bis(trifluoromethane)sulfonylimide ($LiN(CF_3SO_2)_2$), lithium bis(fluorosulfonyl)imide ($LiN(FSO_2)_2$) (LiSFI), and combinations thereof. Examples of nonaqueous aprotic organic solvents include alkyl carbonates, for example, cyclic carbonates (e.g., ethylene carbonate (EC), propylene carbonate (PC), butylene carbonate (BC), fluoroethylene carbonate (FEC)), linear carbonates (e.g., dimethyl carbonate (DMC), diethyl carbonate (DEC), ethylmethylcarbonate (EMC)), aliphatic carboxylic esters (e.g., methyl formate, methyl acetate, methyl propionate), γ-lactones (e.g., γ-butyrolactone, γ-valerolactone), chain structure ethers (e.g., 1,2-dimethoxyethane, 1-2-diethoxyethane, ethoxymethoxyethane), cyclic ethers (e.g., tetrahydrofuran, 2-methyltetrahydrofuran), 1,3-dioxolane), sulfur compounds (e.g., sulfolane), and combinations thereof. In embodiments where the electrolyte 18 is in the form of a solid, the electrolyte 18 may function as both an electrolyte and a separator and may eliminate the need for a discreate separator 16.

The positive electrode material layer 20 includes one or more electrochemically active materials that can undergo a reversible redox reaction with lithium at a higher electrochemical potential than the electrochemically active material of the negative electrode material layer 24 such that an electrochemical potential difference exists between the positive and negative electrode material layers 20, 24. For example, the positive electrode material layer 20 may comprise a material that can sufficiently undergo lithium intercalation and deintercalation, alloying and dealloying, or plating and stripping. In one form, the positive electrode material layer 20 may comprise an intercalation host material that can undergo the reversible insertion or intercalation of lithium ions. In such case, the intercalation host material may comprise a layered oxide represented by the formula $LiMeO_2$, an olivine-type oxide represented by the formula $LiMePO_4$, a spinel-type oxide represented by the formula $LiMe_2O_4$, a tavorite represented by one or both of the following formulas $LiMeSO_4F$ or $LiMePO_4F$, or a combination thereof, where Me is a transition metal (e.g., Co, Ni, Mn, Fe, Al, V, or a combination thereof). In another form, the positive electrode material layer 20 may comprise a conversion material including a component that can undergo a reversible electrochemical reaction with lithium, in which the component undergoes a phase change or a change in crystalline structure accompanied by a change in oxidation state. In such case, the conversion material may comprise sulfur, selenium, tellurium, iodine, a halide (e.g., a fluoride or chloride), sulfide, selenide, telluride, iodide, phosphide, nitride, oxide, oxysulfide, oxyfluoride, sulfur-fluoride, sulfur-oxyfluoride, or a lithium and/or metal compound thereof. Examples of metals for inclusion in the conversion material include iron, manganese, nickel, copper, and cobalt.

The electrochemically active material of the positive electrode material layer 20 may be intermingled with a polymer binder to provide the layer 20 with structural integrity. Examples of polymer binders for inclusion in the positive electrode material layer 20 include polyvinylidene fluoride (PVdF), polytetrafluoroethylene (PTFE), ethylene propylene diene monomer (EPDM) rubber, styrene butadiene rubber (SBR), carboxymethyl cellulose (CMC), nitrile butadiene rubber (NBR), styrene-butadiene rubber (SBR), polyacrylates, alginates, polyacrylic acid, and mixtures thereof. The positive electrode material layer 20 optionally may include particles of an electrically conductive material. Examples of electrically conductive materials include carbon-based materials, metals (e.g., nickel), and/or electrically conductive polymers. Examples of electrically conductive carbon-based materials include carbon black (e.g., acetylene black), graphite, graphene (e.g., graphene nanoplatelets), carbon nanotubes, and/or carbon fibers (e.g., carbon nanofibers). Examples of electrically conductive polymers include polyaniline, polythiophene, polyacetylene, and/or polypyrrole.

The positive and negative electrode current collectors 22, 26 are electrically conductive and provide an electrical connection between the external circuit 30 and their respective positive and negative electrode material layers 20, 24. The positive and negative electrode current collectors 22, 26 may be in the form of nonporous metal foils, perforated metal foils, porous metal meshes, or a combination thereof. The positive electrode current collector 22 may be formed from aluminum (Al) or another appropriate electrically conductive material. The negative electrode current collector 26 may be made of copper, nickel, or alloys thereof, stainless steel, or other appropriate electrically conductive material.

The negative electrode material layer 24 includes particles of an electrochemically active material that facilitates the storage and release of lithium ions from the negative electrode material layer 24 by undergoing a reversible redox reaction with lithium during charging and discharge of the electrochemical cell 10. For example, the negative electrode material layer 24 may comprise particles of one or more electrochemically active materials that can act as a lithium "host" material by undergoing lithium intercalation and deintercalation, alloying and dealloying, or plating and stripping. In embodiments, the electrochemically active material of the negative electrode material layer 24 includes a silicon-based material. As an electrochemically active material, silicon (Si) can facilitate the storage of lithium in the negative electrode material layer 24 during charging of the electrochemical cell 10 by forming an alloy with lithium. During discharge of the electrochemical cell 10, lithium ions can be released from the negative electrode material layer 24 by dealloying from silicon. The term "silicon-based," as used herein with respect to the electrochemically active material of the negative electrode material layer 24, broadly includes materials in which silicon is the single largest constituent on a weight percentage (%) basis. This may include materials having, by weight, greater than 50% silicon, as well as those having, by weight, less than 50% silicon, so long as silicon is the single largest constituent of the material. The electrochemically active material of the negative electrode material layer 24 may comprise—in addition to silicon— carbon (e.g., graphite, activated carbon, carbon black, and/or graphene), tin oxide, aluminum, indium, zinc, germanium, titanium oxide, and/or lithium titanate.

The negative electrode material layer 24 is configured to provide the electrochemical cell 10 with a stoichiometric surplus of lithium prior to initial charging of the electrochemical cell 10 and includes particles of a lithiated (or lithium-containing) electrochemically active material. As shown in FIG. prior to initial charging of the electrochemical cell 10, the negative electrode material layer 24 includes a matrix phase 32 and a particulate phase 34 dispersed throughout the matrix phase 32. The particulate phase 34 includes electrochemically active composite lithium-silicon (Li—Si) alloy particles 36 and optionally may include electrically conductive particles 38. The matrix phase 32 may account for, by weight, greater than or equal to 0% or 2%, less than 40% or 20%, or between 0-40% or 2-20% of the negative electrode material layer 24. The particulate phase 34 may account for, by weight, greater than or equal to 60% or 80%, less than or equal to 98% or 96%, or between 60-98% or 80-96% of the negative electrode material layer 24. The electrochemically active composite Li—Si alloy particles 36 may account for, by weight, greater than or equal to 60% or 80%, less than or equal to 96% or 90%, or between 60-96% or 80-90% of the negative electrode material layer 24.

In some embodiments, the particulate phase 34 of the negative electrode material layer 24 also may include particles of one or more electrochemically active negative electrode materials (not shown) in addition to the composite Li—Si alloy particles 36. Examples of electrochemically active negative electrode materials that may be included in the negative electrode material layer 24 in addition to the composite Li—Si alloy particles 36 include graphite, silicon (Si), tin (Sn), silicon-containing compounds, and/or tin-containing compounds, such as SiSn, SiSnFe, SiSnAl, SiFeCo, $SnO_2$, and/or $SiO_2$. When the negative electrode material layer 24 includes one or more electrochemically active negative electrode materials in addition to the composite Li—Si alloy particles 36, the one or more electrochemically active negative electrode materials and the composite Li—Si alloy particles 36 may account for, by weight, greater than or equal to 60% or 80%, less than or equal to 96% or 90%, or between 60-96% or 80-90% of the negative electrode material layer 24.

The matrix phase 32 of the negative electrode material layer 24 provides structural support to the particulate phase 34 and is made of a polymer binder. Examples of polymer binders that may be used to form the matrix phase 32 of the negative electrode material layer 24 include polyvinylidene fluoride (PVdF), polytetrafluoroethylene (PTFE), ethylene propylene diene monomer (EPDM) rubber, styrene butadiene rubber (SBR), carboxymethyl cellulose (CMC), nitrile butadiene rubber (NBR), styrene-butadiene rubber (SBR), polyacrylates, alginates, polyacrylic acid, and combinations thereof.

When included in the particulate phase 34 of the negative electrode material layer 24, the electrically conductive particles 38 may facilitate transport of electrons between the electrochemically active composite Li—Si alloy particles 36 and the negative electrode current collector 26 during cycling of the electrochemical cell 10. The electrically conductive particles 38 may comprise particles of a carbon-based material, metal particles (e.g., powdered nickel), and/or an electrically conductive polymer. Examples of electrically conductive carbon-based materials include carbon black (e.g., acetylene black), graphite, graphene (e.g., graphene nanoplatelets), carbon nanotubes, and/or carbon fibers (e.g., carbon nanofibers). Examples of electrically conductive polymers include polyaniline, polythiophene, polyacetylene, and/or polypyrrole. The electrically conductive particles 38 may have a mean particle diameter in a range of 2 nanometers to 20 micrometers and may account for, by weight, greater than 0% or 2%, less than 20% or 18%, or between 0-20% or 2-18%, of the negative electrode material layer 24

Figure 2:
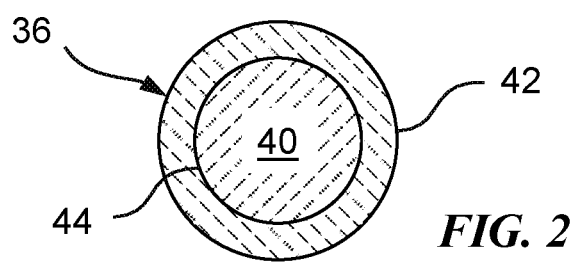
FIG. 2 is a schematic cross-sectional view of a composite Li—Si alloy particle having a core-shell structure that includes a core made of an Li—Si alloy particle and a shell surrounding the core made of a solid ionically conductive and electrically insulating material.

As best shown in FIG. 2, the electrochemically active composite Li—Si alloy particles 36 of the negative electrode material layer 24 exhibit a core-shell structure including a core 40 and a shell 42 surrounding the core 40. In each of the composite Li—Si alloy particles 36, the core 40 may be entirely encapsulated by the shell 42, meaning that the shell 42 may extend over an entire outer surface 44 of the core 40. The core 40 may be substantially round and may have a mean particle diameter of greater than or equal to about 2 nanometers and less than or equal to about 20 micrometers. In embodiments, the core 40 may have a mean particle diameter of greater than or equal to about one micrometer and less than or equal to about 20 micrometers. The shell 42 may have a thickness above the outer surface 44 of the core 40 in the range of about one nanometer to about 100 nanometers. The core 40 may account for, by weight, about 99% to about 99.99% of the composite Li—Si alloy particles 36, and the shell 42 may account for, by weight, about 0.01% to about 1% of the composite Li—Si alloy particles 36.

The core 40 of each of the composite Li—Si alloy particles 36 is made of an alloy of lithium (Li) and silicon (Si), i.e., an Li—Si alloy. The Li—Si alloy of the core 40 may include, by weight, 5-50% lithium and 50-95% silicon. More preferably, the core 40 of each of the composite Li—Si alloy particles 36 may include, by weight, 30-40% lithium and 60-70% silicon. In embodiments, the core 40 of each of the composite Li—Si alloy particles 36 may consist essentially of an alloy of lithium (Li) and silicon (Si). In embodiments, the composition of the Li—Si alloy of the core 40 may be represented by the formula $Li_{4.4x}Si$, where $0 \leq x \leq 0.85$. The Li—Si alloy particles may be substantially round solid particles having a mean particle diameter of greater than or equal to about 2 nanometers and less than or equal to about 40 micrometers. In embodiments, the Li—Si alloy particles may have a mean particle diameter of greater than or equal to about one micrometer and less than or equal to about 20 micrometers.

Without intending to be bound by theory, it is believed that the lithium in the Li—Si alloy of the core 40 can effectively provide the electrochemical cell 10 with a stoichiometric surplus of lithium prior to initial charging of the electrochemical cell 10. In other words, after assembly of the electrochemical cell 10, the lithium in the Li—Si alloy of the core 40 may be released therefrom and participate in the electrochemical redox reactions occurring within the electrochemical cell 10 during discharge and recharge of the electrochemical cell 10. As such, including the composite Li—Si alloy particles 36 in the negative electrode material layer 24 during initial assembly of the electrochemical cell 10 can compensate for the subsequent loss of active lithium in the electrochemical cell 10, which may occur as a result of parasitic reactions between elemental lithium metal and the electrolyte 18 during cycling of the electrochemical cell 10.

The shell 42 of each of the composite Li—Si alloy particles 36 is made of a solid ionically conductive and electrically insulating material, referred to herein as a solid electrolyte material. The solid electrolyte material of the shell 42 is formulated to provide a passivation layer on the outer surface 44 of the core 40 that helps prevent the Li—Si alloy of the core 40 from participating in undesirable chemical reactions with other components of the electrochemical cell 10 and/or the negative electrode material layer 24, which may occur during manufacture of the negative electrode material layer 24 and/or during operation of the electrochemical cell 10. As such, formation of the shell 42 on the Li—Si alloy of the core 40 may allow the Li—Si alloy to be incorporated into the negative electrode material layer 24 without having to restrict the types of polymer binders and/or organic solvents used during the manufacturing process. In other words, formation of the shell 42 on the Li—Si alloy of the core 40 may allow matrix phase 32 of the negative electrode material layer 24 to be formed using a relatively broad range of polymer binders and may allow for the use of a relatively broad range of organic solvents during manufacture of the negative electrode material layer 24 than would otherwise be the case without the solid electrolyte material of the shell 42. In addition, the solid electrolyte material of the shell 42 is formulated to exhibit high ionic conductivity, and thus does not inhibit the electrochemical activity of the Li—Si alloy of the core 40 during cycling of the electrochemical cell 10.

The solid electrolyte material of the shell 42 may comprise one or more inorganic lithium (Li)-, phosphorus (P)-, and sulfur (S)-containing compounds referred to herein as lithium thiophosphates (LPS). In embodiments, the solid electrolyte material of the shell 42 may consist essentially of lithium (Li), phosphorus (P), and sulfur (S). The solid electrolyte material may comprise a lithium thiophosphate represented by the formula $Li_{4-x}P_xS_4$, wherein $0<x\leq3$. For example, the lithium thiophosphate solid electrolyte material of the shell 42 may comprise, by weight, 3-15% lithium, 10-40% phosphorus, and 50-90% sulfur. As another example, the lithium thiophosphate solid electrolyte material of the shell 42 may comprise, by weight, 10-14% lithium, 15-20% phosphorus, and 60-80% sulfur. The lithium thiophosphate solid electrolyte material of the shell 42 may be a sulfur-based material. The term "sulfur-based," as used herein with respect to the lithium thiophosphate solid electrolyte material of the shell 42, broadly includes materials in which sulfur is the single largest constituent on a weight percentage (%) basis. This may include materials having, by weight, greater than 50% sulfur, as well as those having, by weight, less than 50% sulfur, so long as sulfur is the single largest constituent of the material. In some embodiments, the solid electrolyte material may comprise a lithium thiophosphate represented by the formula $Li_3PS_4$.

In embodiments, the solid electrolyte material of the shell 42 may be halogenated and may be doped with one or more halogen elements, e.g., chlorine (Cl), bromine (Br), and/or iodine (I). In such case, the solid electrolyte material of the shell 42 may consist essentially of lithium (Li), phosphorus (P), sulfur (S), and one or more of chlorine (Cl), bromine (Br), or iodine (I). In embodiments where the solid electrolyte material of the shell 42 is halogenated, the solid electrolyte material may comprise a halogenated lithium thiophosphate represented by the formula $Li_{7-m}PS_{6-m}X_m$, where $0 \leq m \leq 1$ and where X=Cl, Br, and/or I). In such case, one or more halogen elements may be present in the lithium thiophosphate solid electrolyte material of the shell 42 in an amount constituting, by weight, greater than 0%, 1%, or 5%, less than or equal to 35%, 20%, or 10%, or between 0-35%, 1-20%, or 5-10% of the lithium thiophosphate solid electrolyte material.

The lithium thiophosphate solid electrolyte material of the shell 42 may be at least partially amorphous. In some embodiments, some regions of the lithium thiophosphate solid electrolyte material may exhibit an amorphous structure, while other regions may exhibit a crystalline structure. In other embodiments, the lithium thiophosphate solid electrolyte material of the shell 42 may be substantially or entirely amorphous. The lithium thiophosphate solid electrolyte material of the shell 42 may exhibit an ionic conductivity in a range of $3 \times 10^{-7}$ S/cm to $1.6 \times 10^{-4}$ S/cm at a temperature of about 25° C.

The shell 42 may be in the form of a single substantially homogenous layer, or the shell 42 may comprise more than one layer of material on the outer surface 44 of the core 40. In embodiments where the shell 42 exhibits a multilayered structure (not shown), the shell 42 may comprise an inner layer made of the lithium thiophosphate solid electrolyte material and formed directly on the outer surface 44 of the core 40 and an outer layer made of a carbon-based material and formed on the outer surface 44 of the core 40 over the inner layer.

A method of manufacturing the composite Li—Si alloy particles 36 may include providing a plurality of Li—Si alloy particles and contacting the Li—Si alloy particles with a precursor solution to form a thin layer of lithium thiophosphate solid electrolyte material on an outer surface of the Li—Si alloy particles. The Li—Si alloy particles may have the same chemical composition of that of the Li—Si alloy of the core 40 and may have a mean particle diameter of greater than or equal to about 2 nanometers and less than or equal to about 40 micrometers. In embodiments, the Li—Si alloy particles may have a mean particle diameter of greater than or equal to about one micrometer and less than or equal to about 20 micrometers. Li—Si alloy particles and methods of making Li—Si alloy particles exhibiting these properties are described in U.S. patent application Ser. No. 16/706,351 filed on Dec. 6, 2019 entitled "Methods of Forming Prelithiated Silicon Alloy Electroactive Materials," the contents of which are incorporated herein by reference in their entirety.

The precursor solution used to form the lithium thiophosphate solid electrolyte material on the outer surface of the Li—Si alloy particles may include a phosphorus (P)- and sulfur (S)-containing compound (referred to herein as a phosphorus sulfide compound) dissolved or dispersed in an organic solvent or a mixture of organic solvents. The phosphorus sulfide compound may comprise, by weight, 10-70% phosphorus and 30-90% sulfur. More preferably, the phosphorus sulfide compound may comprise, by weight, 15-25% phosphorus and 75-85% sulfur. In embodiments, the phosphorus sulfide compound may be represented by the formula $P_4S_x$, wherein x is an integer and wherein $2 \leq x \leq 16$. In some embodiments, the phosphorus sulfide compound may be a sulfur-rich phosphorus sulfide represented by the formula $P_4S_6$.

The organic solvent used to prepare the precursor solution may comprise a polar aprotic organic solvent or a mixture of polar aprotic organic solvents. Polar aprotic organic solvents include polar aprotic organic compounds such as amido compounds, lactam compounds, urea compounds, organic sulfur compounds, and cyclic organic phosphorous compounds. Amido compounds for the polar aprotic organic solvent may include N,N-dimethylformamide, N,N-diethylformamide, N,N-dimethylacetamide, N,N-dipropylacetamide, and/or N,N-dimethyl benzoic acid amide. Lactam compounds for the polar aprotic organic solvent may include caprolactam; N-alkylcaprolactams such as N-methylcaprolactam, N-ethylcaprolactam, N-isopropylcaprolactam, N-isobutylcaprolactam, N-n-propylcaprolactam, N-n-butylcaprolactam, and/or N-cyclohexylcaprolactam; N-methyl-2-pyrrolidone, N-ethyl-2-pyrrolidone, N-isopropyl-2-pyrrolidone, N-isobutyl-2-pyrrolidone, N-n-propyl-2-pyrrolidone, N-n-butyl-2-pyrrolidone, N-cyclohexyl-2-pyrrolidone, N-methyl-3-methyl-2-pyrrolidone, N-ethyl-3-methyl-2-pyrrolidone, N-methyl-3,4,5-trimethyl-2-pyrrolidone, N-methyl-2-piperidone, N-ethyl-2-piperidone, N-isopropyl-2-piperidone, N-methyl-6-methyl-2-piperidone, and/or N-methyl-3-ethyl-2-piperidone. In some embodiments, the polar aprotic organic solvent may comprise or consist essentially of N-methyl-2-pyrrolidone.

The Li—Si alloy particles may be placed in contact with the precursor solution, for example, by immersing the Li—Si alloy particles in the precursor solution. The Li—Si alloy particles may be immersed in the precursor solution at room temperature (e.g., about 25° C.) for a duration in a range of 1 hour to 24 hours.

After formation of the lithium thiophosphate solid electrolyte layer on the surface of each of the Li—Si alloy particles, the composite Li—Si alloy particles 36 may be separated from the organic solvent, for example, by filtering. Additional organic solvent may be removed from the composite Li—Si alloy particles 36, for example, by drying the composite Li—Si alloy particles 36 at a temperature above the boiling point of the organic under a stream of an inert gas (e.g., $N_2$) at standard atmospheric pressure (i.e., about 1 Atm) or in a subatmospheric pressure environment (i.e., less than 1 Atm) for a duration in a range of 5 minutes to 3 hours.

The thickness of the lithium thiophosphate solid electrolyte layer formed on the surface of the Li—Si alloy particles may be controlled or adjusted by controlling the concentration of the phosphorus sulfide compound in the precursor solution. For example, the concentration of the phosphorus sulfide compound in the precursor solution may be in a range of 1 mg/mL to 20 mg/mL and the lithium thiophosphate solid electrolyte layer formed on the surface of the Li—Si alloy particles may have a thickness in the range of one nanometer to 100 nanometers.

A method of manufacturing the negative electrode 14 may include forming a negative electrode material layer on a surface of a metal substrate, and then cutting or punching the metal substrate and the negative electrode material layer into a desired size and shape. The negative electrode material layer formed on the surface of the metal substrate may have the same chemical composition and physical properties as that of the negative electrode material layer 24.

The negative electrode material layer may be formed on the surface of the metal substrate by preparing a slurry or precursor mixture including the composite Li—Si alloy particles 36 and optionally the electrically conductive particles 38 dispersed in a solution of a polymer binder dissolved in an organic solvent.

The organic solvent used to prepare the precursor mixture may comprise a polar or nonpolar organic solvent. Examples of polar aprotic organic solvents that may be used to prepare the precursor mixture include dimethylacetamide (DMAC), N-methyl-2-pyrrolidone (NMP), dimethylformamide (DMF), dimethylsulfoxide (DMSO), and combinations thereof. Examples of nonpolar organic solvents that may be used to prepare the precursor mixture include toluene, dioxolane, pentane, hexane, cyclohexane, benzene, chloroform, dimethoxyethane, dimethyl ether, and/or diethyl ether. The organic solvent may be present in the precursor mixture in an amount constituting, by weight, 20-80% of the precursor mixture.

The polymer binder may comprise a polymeric, oligomeric, or monomeric chemical compound that exhibits good solubility in the selected organic solvent and can form a robust adhesive bond with the surface of the metal substrate and with the composite Li—Si alloy particles 36 and optionally the electrically conductive particles 38. Examples of polymer binders that may be used to prepare the precursor mixture include halogenated hydrocarbon polymers (e.g., polyvinylidene chloride and/or polyvinylidene fluoride, PVdF), polytetrafluoroethylene (PTFE), ethylene propylene diene monomer (EPDM) rubber, styrene butadiene rubber (SBR), carboxymethyl cellulose (CMC), nitrile butadiene rubber (NBR), styrene-butadiene rubber (SBR), polyacrylates, alginates (e.g., sodium alginate), polyacrylic acid (PAA), hexafluoropropylene (HFP), ethylene acrylic acid copolymer (EAA), ethylene vinyl acetate copolymer (EVA), and combinations thereof.

The precursor mixture may be deposited on the surface of the metal substrate by spreading or casting the precursor mixture on the surface of the metal substrate, for example, using a doctor blade, a slot die coater, or other suitable deposition technique. The precursor mixture may be deposited on the surface of the metal substrate in a relatively low humidity environment, e.g., in an environment having less than 0.1 ppm oxygen ($O_2$) and/or water ($H_2O$).

After formation of the precursor layer on the surface of the metal substrate, at least a portion of the solvent may be removed from the precursor layer to form a layer of negative electrode material. The solvent may be removed from the precursor layer by evaporating at least a portion of the solvent from the precursor layer in a room temperature environment (e.g., about 25° C.), by heating the precursor layer at a temperature greater than 25° C. and less than 300° C., at atmospheric pressure (e.g., 1 Atm), and/or in a vacuum or subatmospheric environment (e.g., less than 1 Atm).

After removal of the solvent, the layer of negative electrode material may exhibit a porosity of greater than or equal to 50% or 55%, less than or equal to 70% or 65%, or between 50-70% or 55-65%. After removal of the solvent, the layer of negative electrode material may exhibit a thickness in a range of 40 micrometers to 100 micrometers. In embodiments, the layer of negative electrode material may be compressed by being subjected to a pressing or so-called "calendaring" process. After calendaring, the layer of negative electrode material may exhibit a porosity of greater than or equal to 20% or 25%, less than or equal to 50% or 45%, or between 20-50% or 25-45%. After calendaring, the layer of negative electrode material may exhibit a thickness in a range of 20 micrometers to 60 micrometers.

These and other benefits will be readily appreciated by those of ordinary skill in the art in view of the forgoing disclosure.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:

1. A method of making a negative electrode for a secondary lithium battery, the method comprising:
    contacting lithium-silicon (Li—Si) alloy particles with a precursor solution including a phosphorus sulfide compound dissolved in an organic solvent to form a lithium thiophosphate solid electrolyte layer directly on and over an entire outer surface of each of the Li—Si alloy particles, each of the Li—Si alloy particles having a particle diameter in a range of one micrometer to 40 micrometers, and the lithium thiophosphate solid electrolyte layer surrounding each of the Li—Si alloy particles having a thickness in a range of one nanometer to 100 nanometers;
    maintaining contact between the Li—Si alloy particles and the precursor solution until each of the Li—Si alloy particles is entirely encapsulated by the lithium thiophosphate solid electrolyte layer; and
    separating the Li—Si alloy particles from the organic solvent, preparing a precursor mixture including the Li—Si alloy particles and a polymer binder; and
    depositing the precursor mixture on a surface of a metal substrate to form the negative electrode.

2. The method of claim 1 wherein the organic solvent comprises a polar aprotic organic solvent.

3. The method of claim 1 wherein the organic solvent comprises N-Methyl-2-pyrrolidone.

4. The method of claim 1 wherein the phosphorus sulfide compound comprises, by weight, 15-25% phosphorus and 75-85% sulfur.

5. The method of claim 1 wherein the phosphorus sulfide compound is represented by the formula $P_4S_x$, wherein x is an integer and wherein $2 \leq x \leq 16$.

6. The method of claim 1 wherein the phosphorus sulfide compound comprises $P_4S_{16}$.

7. The method of claim 1 wherein the phosphorus sulfide compound is present in the precursor solution at a concentration in a range of 1 mg/mL to 20 mg/mL.

8. The method of claim 1 wherein the lithium thiophosphate solid electrolyte layer is at least partially amorphous and exhibits an ionic conductivity in a range of $3 \times 10^{-7}$ S/cm to $1.6 \times 10^{-4}$ S/cm at a temperature of 25° C.

9. The method of claim 1 wherein the lithium thiophosphate solid electrolyte layer comprises, by weight, 3-15% lithium, 10-40% phosphorus, and 50-90% sulfur.

10. A method of making a negative electrode for a secondary lithium battery, the method comprising:

preparing a precursor mixture including electrochemically active particles, electrically conductive carbon particles, and a polymer binder dissolved in an organic solvent, the electrochemically active particles including composite lithium-silicon (Li—Si) alloy particles;

depositing the precursor mixture on a surface of a metal substrate to form a precursor layer thereon; and removing at least a portion of the organic solvent from the precursor layer to form a negative electrode layer on the surface of the substrate, wherein the Li—Si alloy particles exhibit a core-shell structure including a core made a lithium-silicon (Li—Si) alloy and a shell surrounding the core made of a lithium thiophosphate solid electrolyte material, wherein the shell is formed directly on an outer surface of the core, and wherein the core of each of the Li—Si alloy particles has a particle diameter in a range of one micrometer to 40 micrometers and the shell surrounding the core of each of the Li—Si alloy particles has a thickness in a range of one nanometer to 100 nanometers.

11. The method of claim 10 wherein the Li—Si alloy particles comprise a lithium-silicon (Li—Si) alloy represented by a formula $Li_{4.4x}Si$, where $0 \leq x \leq 0.85$, and wherein the lithium thiophosphate solid electrolyte material comprises, by weight, 3-15% lithium, 10-40% phosphorus, and 50-90% sulfur.

12. A negative electrode for a secondary lithium battery, the negative electrode comprising:

a negative electrode layer disposed on a surface of a metal substrate, the negative electrode layer including a matrix phase and a particulate phase dispersed throughout the matrix phase, wherein the particulate phase includes composite lithium-silicon (Li—Si) alloy particles, wherein each of the composite Li—Si alloy particles includes a core made of an electrochemically active lithium-silicon (Li—Si) alloy and a shell surrounding the core made of a lithium thiophosphate solid electrolyte material, wherein the shell is formed directly on an outer surface of the core, and wherein the core of each of the Li—Si alloy particles has a particle diameter in a range of one micrometer to 40 micrometers and the shell surrounding the core of each of the Li—Si alloy particles has a thickness in a range of one nanometer to 100 nanometers.

13. The negative electrode of claim 12 wherein the matrix phase includes a polymer binder, and wherein the particulate phase includes the composite Li—Si alloy particles and electrically conductive carbon particles.

14. The negative electrode of claim 12 wherein the matrix phase accounts for, by weight, 2-20% of the negative electrode layer, the particulate phase accounts for, by weight, 60-98% of the negative electrode layer, and the electrochemically active composite Li—Si alloy particles account for, by weight, 60-96% of the negative electrode layer.

15. The negative electrode of claim 12 wherein the lithium thiophosphate solid electrolyte material is at least partially amorphous and exhibits an ionic conductivity in a range of $3 \times 10^{-7}$ S/cm to $1.6 \times 10^{-4}$ S/cm at a temperature of 25° C.

16. The negative electrode of claim 12 wherein the lithium thiophosphate solid electrolyte material comprises, by weight, 3-15% lithium, 10-40% phosphorus, and 50-90% sulfur.

17. The negative electrode of claim 12 wherein the lithium thiophosphate solid electrolyte material comprises $Li_3PS_4$.

18. The negative electrode of claim 12 wherein the lithium thiophosphate solid electrolyte material comprises a halogenated lithium thiophosphate that includes at least one halogen element of chlorine, bromine, or iodine, and wherein the at least one halogen element is present in the halogenated lithium thiophosphate in an amount constituting, by weight, greater than 0% and less than or equal to 35% of the halogenated lithium thiophosphate.

* * * * *